(12) United States Patent
Whelan et al.

(10) Patent No.: US 8,166,208 B2
(45) Date of Patent: Apr. 24, 2012

(54) METHOD AND SYSTEM FOR XML DATA TRANSFER TRANSACTIONAL COALESCING

(75) Inventors: John Staehle Whelan, White Bear Lake, MN (US); Mark Ludwig, Minneapolis, MN (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 86 days.

(21) Appl. No.: 12/767,603

(22) Filed: Apr. 26, 2010

(65) Prior Publication Data

US 2011/0264831 A1    Oct. 27, 2011

(51) Int. Cl.
*G06F 3/00* (2006.01)
(52) U.S. Cl. .............. 710/5; 710/6; 710/29; 710/52; 710/58
(58) Field of Classification Search .................. None
See application file for complete search history.

(56) References Cited

U.S. PATENT DOCUMENTS 6,898,639 B2 * 5/2005 Muramatsu ............... 709/232
7,506,075 B1 * 3/2009 Armstrong et al. ............ 710/6

FOREIGN PATENT DOCUMENTS

WO      WO 0072532 A1    11/2000

OTHER PUBLICATIONS

PCT International Search Report dated Jul. 12, 2011 corresponding to PCT Application No. PCT/US2011/03828 filed Apr. 18, 2011 (11 pages).
Skordoulis, et al. In IEEE Wireless Communications, vol. 14, No. 1, Feb. 1, 2008 (pp. 40-47); Magazine (8 pages).
Makineni, et al. In High Performance Computing—HIPC 2006 Lecture Notes in Computer Science, Jan. 1, 2006 (pp. 289-300); Magazine (12 pages).

* cited by examiner

*Primary Examiner* — Alan Chen

(57) ABSTRACT

A system, method, and computer readable medium. A method includes setting a maximum translation delay. The method includes, while a current delay is less than the maximum transfer delay, repeatedly performing the steps of searching for an additional transfer having a same source and target as a current transfer, and when an additional transfer is found, adding the additional transfer to a transfer list that identifies transfers to be made together. The method includes performing a transfer of the transfers identified by the transfer list when the current delay has met or exceeded the maximum transfer delay.

21 Claims, 3 Drawing Sheets

METHOD AND SYSTEM FOR XML DATA TRANSFER TRANSACTIONAL COALESCING

TECHNICAL FIELD

The present disclosure is directed, in general, to systems and methods for use in computer-aided design, manufacturing, engineering, modeling, and visualization (individually and collectively, "CAD" and "CAD systems") and in product lifecycle management ("PLM") and other systems.

BACKGROUND OF THE DISCLOSURE

Many manufactured products are first designed and modeled in CAD systems, and PLM systems are used my manufacturers, retailers, customer, and other users to manage the design, use, and disposal of various products. Improved systems are desirable.

SUMMARY OF THE DISCLOSURE

Various embodiments include a system, method, and computer readable medium. A method includes method includes setting a maximum translation delay. The method includes, while a current delay is less than the maximum transfer delay, repeatedly performing the steps of searching for an additional transfer having a same source and target as a current transfer, and when an additional transfer is found, adding the additional transfer to a transfer list that identifies transfers to be made together. The method includes performing a transfer of the transfers identified by the transfer list when the current delay has met or exceeded the maximum transfer delay.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
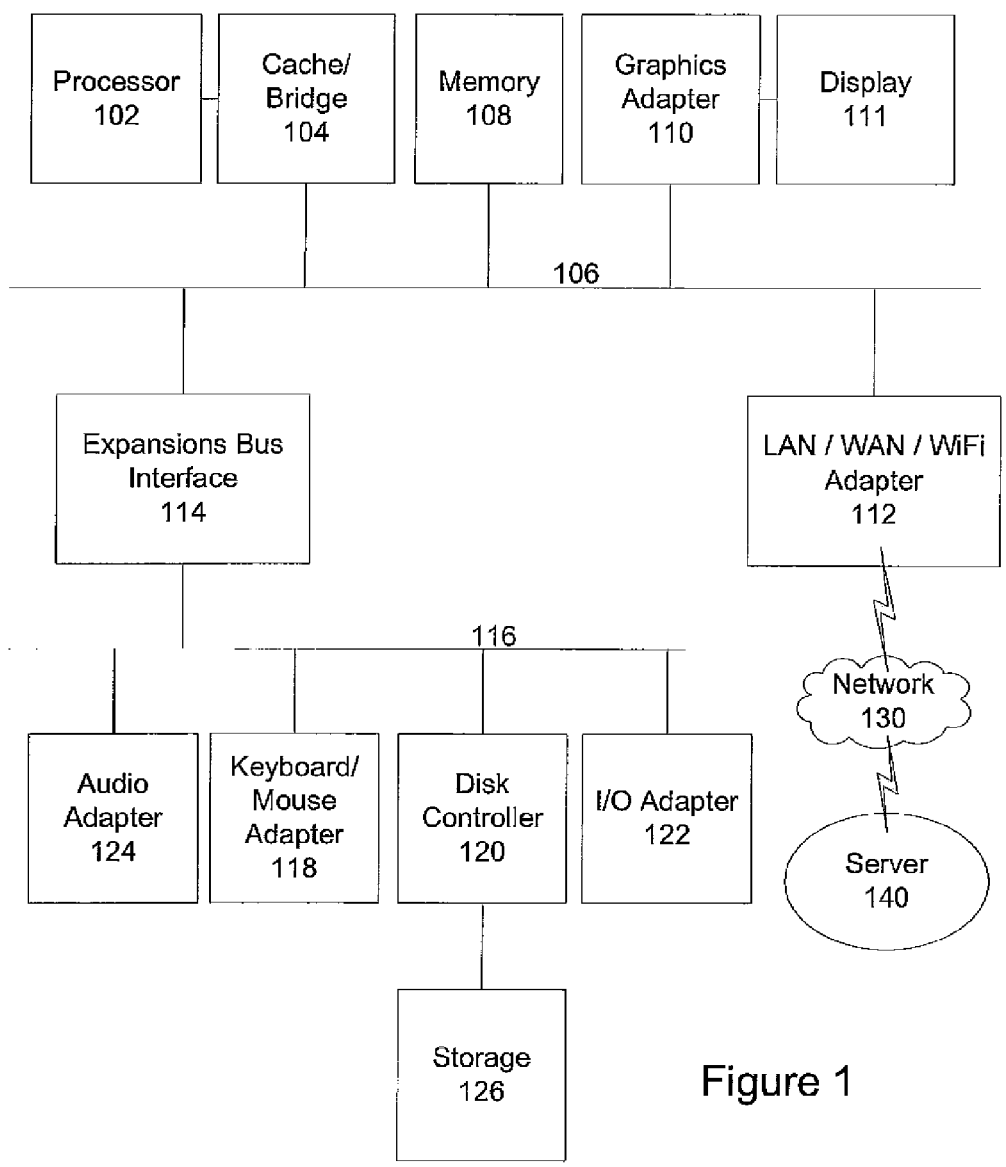
FIG. 1 depicts a block diagram of a data processing system in which an embodiment can be implemented.
Figure 2:
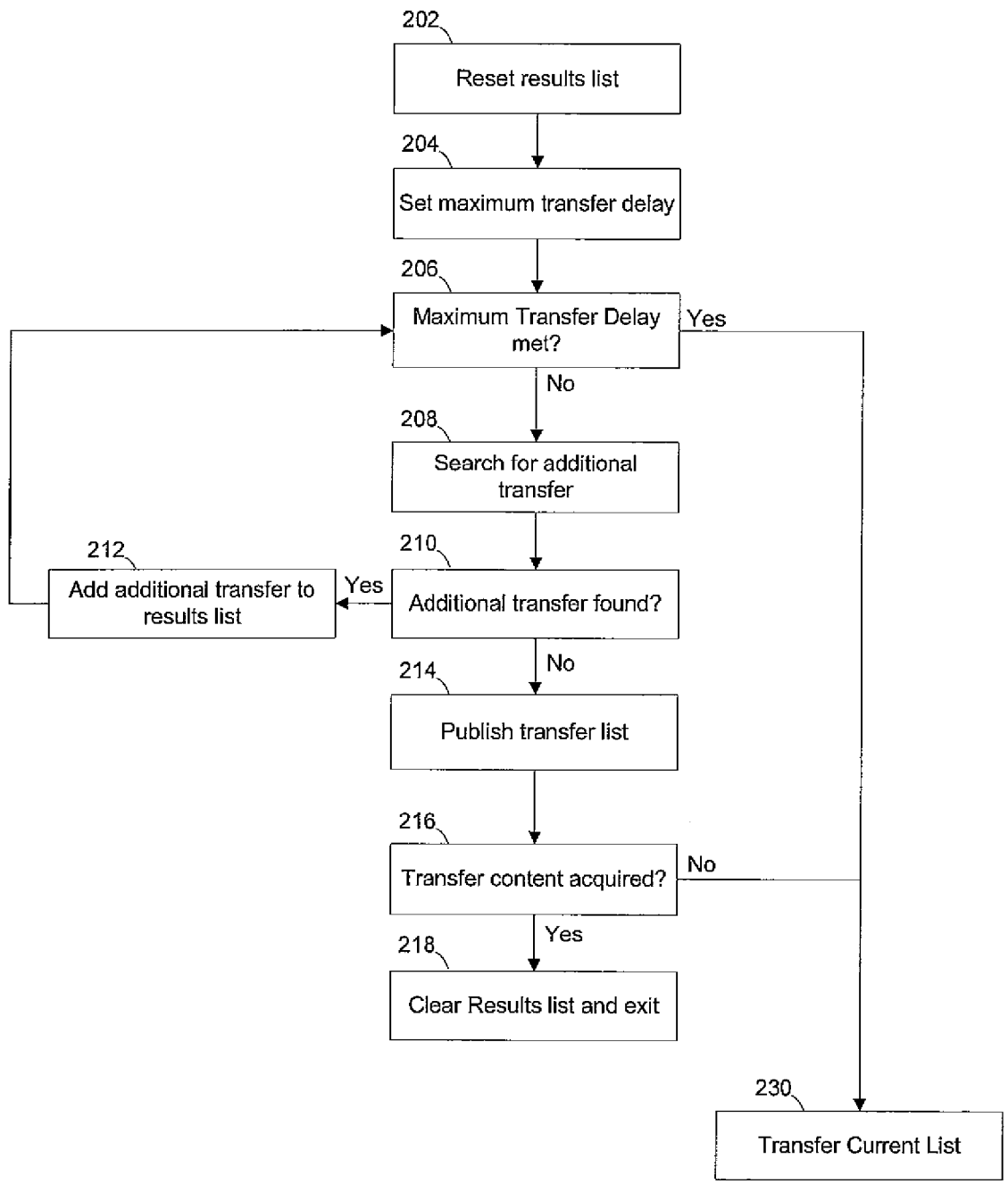
FIG. 2 depicts a data transfer including a transfer coalescing process in accordance with disclosed embodiments that can be performed by a data processing system as described herein.
Figure 3:
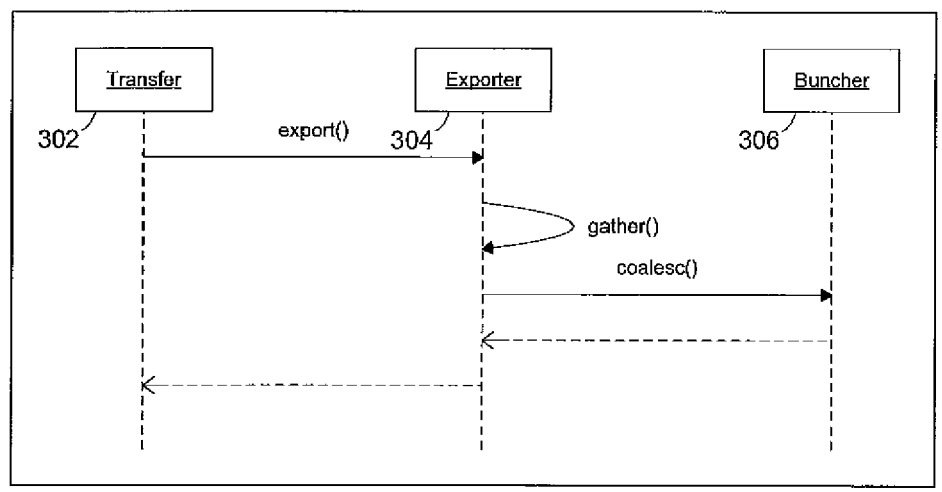
FIG. 3 illustrates an example implementation in accordance with disclosed embodiments.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Extensible Markup Language (XML) data transfers such as extract, transform, load, and others can consume a large amount of fixed processing costs which are independent of the size of the data being transferred. Additionally, software designed to transfer data is usually less efficient if it needs to work well input data which varies greatly in size.

Disclosed embodiments decrease the variability in size of data transfer payloads and decrease the number of transactions with undersized payloads in order that system efficiency is increased.

FIG. 1 depicts a block diagram of a data processing system in which an embodiment can be implemented as either a client system or server system for performing XML mapping validation as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Disclosed processes combine (or "coalesce" or "bunch") multiple data transfers between two data processing systems into one or more combined transfers, such as between a data processing system 100 and a server system 140, over a network 130, or other similar transfers between data processing systems or between a data processing system and a storage device. Disclosed processes can also be used for data transfer between separate functions in one or more data processing systems. The disclosed processes are particularly useful for XML data transfers, but these techniques can be applied to any transfers.

A basic function implemented in some embodiments is:

new_content=bunching(initial_content, max_bunch_size)

This function cross-references concurrent calls to it, determines if content from different calls can be combined, and combines them if possible. As an example, given two sets of initial transfer content, A and B, such that:

$A=\{u,v,w\}$ $B=\{x,y,z\}$

With a max_bunch_size>=6, calling the bunching function on these two sets could result in any of the following:

bunch($A$)=$\{u,v,w,x,y,z\}$, bunch($B$)=$\{\ \}$ or bunch($A$)=$\{\ \}$, bunch($B$)=$\{u,v,w,x,y,z\}$ or bunch($A$)=$\{u,v,w\}$, bunch($B$)=$\{x,y,z\}$ In some embodiments, the joining of sets will be all-or-nothing, in a simple case. According to other embodiments, the contents of a transfer can be sent to multiple other transfer sets.

FIG. 2 depicts a data transfer including a transfer coalescing process in accordance with disclosed embodiments that can be performed by a data processing system as described herein. In this process it is assumed that the data to be transferred is stored in a data processing system storage and accessible by the system performing the process, and that the actual data transfers can be processed and performed by the system using techniques known to those of skill in the art. The processes described herein can be performed by a single data processing system or multiple data processing systems acting together to perform the described processes.

The system initializes the data transfer by resetting the transfer list of data to be transferred, also referred to in this example as a "results list" (step 202). This is accomplished in some embodiments by setting 'Results=Initial Content', where each data transfer starts with the with a default position that the results of the 'bunching' command will be initial input set. In some embodiments, the results list is reset to an empty list, and so the first "additional transfer" identified below will be the "current transfer".

The system initializes or sets a maximum transfer delay (step 204). In such a 'calculate deadline' step, the system calculates the maximum amount of time that a transfer should be delayed while checking to see if it can be combined with another transfer. In some implementations, the wait time for a transfer will be proportional to the inefficiency of the transfer; and can be approximated by:

deadline=now( )+((max_size-size(req))/
max_size*max_wait_time)

The delay is calculated in real time, and can be measured from the start of the transfer process, that is, when the "current transfer" described below is initiated, or from the time of the previous data transfer, or otherwise as required by the particular implementation. The current accumulated delay for the transfer process is referred to herein as the "current delay". The current delay and the maximum transfer delay can be tracked in terms of absolute delay starting from zero (or another fixed figure), or according to any other time clock or time stamp that tracks the effective delay and the time at which the maximum transfer delay is met.

The maximum transfer delay can be an important aspect of this process as this sets an outside bound for the data transfer. Without such a bound, where there are many transfers to be considered, the actual transfer could be delayed without this factor since the system will repeatedly find new transfers to combine. Similarly, in the opposite case, if there are few transfers being made, then without this factor, the transfer could be delayed by a system that keeps waiting to find an additional transfer to combine, instead of sending the current transfer as-is.

As part of the processing loop, the system determines if the maximum transfer delay has been met or exceeded (step 206). In this 'deadline check' step, the system determines if the transfer should check to see if it can be combined with another transfer request, or if it has run out of time, and should proceed with its current content. If the transfer delay has been met or exceeded, the combining process ends and the actual transfer of data is performed (step 230).

If the maximum transfer delay has not been met or exceeded, the system searches for an additional data transfer to be combined in the current transfer (step 208). In this 'look for filler' step, the system uses a listing of other transfers with the same source and target to see if there is another transfer (a "filler" transfer and transfer request) which can be combined with this one so that the combined size of the two transfers is smaller than max_size.

The system determines if an additional data transfer for such a combination has been found (step 210). In this 'filler found?' step, the system determines if another transfer was found which whose content can be combined with the current transfer's content. In various embodiments, the content can be combined if the transfers have the same source and same destination.

If an additional transfer is found, the system adds the additional transfer to the results list (step 212). This is accomplished in some embodiments by setting 'Results=Results+Filler'. In some embodiments, this step includes removing the content of the additional transfer from the original additional 'filler' transfer request, making it a request with empty content, and adding the additional transfer's content to the current transfer request. Further, in some embodiments, when the current transfer picks up additional content, the system removes the content of the additional transfer from publication. After this step is completed, the process will loop back to step 206.

In some cases, to address issues related to concurrency, this step can include verifying that the content from the additional transfer request is only added to one other combined-transfer request or one results list. This can be accomplished, for example, by managing synchronized access to potential additional transfers. The system can also manage any impact to transaction IDs, and can denote on the combined transfer that it is assuming responsibility for processing the content of the additional transfer.

If an additional transfer was not found at step 210, the system publishes the transfer list, including any previously combined content, as available as additional content in another transfer process (step 214). That is, the system indicates that the current transfer "Results" list of content is available to be combined as with other transfers as filler by another coalescing process executing on the same or a different data processing system. This is accomplished in some embodiments by designating the current list as 'Post as Filler' for the time remaining until the deadline of the current transfer. In various embodiments, the system can post the current transfer as potential filler for other transfer requests with the same source and target. This activity ends when the transfer reaches its deadline, by looping in the next step.

The system determines if the current transfer content was acquired by another transfer as filler (step 216). This 'Filler Acquired?' step checks the results of the 'post as filler' activity.

If the current transfer content was acquired by another transfer as filler (at step 216), the system clears the current transfer results list (step 218). This is accomplished in some embodiments by setting 'Results=empty set'. Because the content of the transfer was acquired by another transfer request, this activity sets the content of the current transfer request to be empty and this coalescing process ends. In other embodiments, the process could repeat to step 206 to continue to search for transfers until the maximum transfer delay expires.

If the current transfer content was not acquired by another transfer as filler (at step 216), the combining process ends and the actual transfer of data is performed (step 230). At this point, since the content was not acquired, the transfer list is removed from publication to ensure the content is not thereafter picked up and re-transferred.

In other embodiments, instead of transferring when the current transfer context is not acquired by another transfer as filler, the system can repeat to step 206 to determine if the maximum transfer delay has been met or exceeded.

Such a process can be used, for example, in an XML transfer process that involves a large data export and transfer. Such a process can be added as a part of a conventional export process, or immediately after an export process as a separate, first-level coalescing process. Embedding the transfer coalescing processing into the export process allows for the resultant XML transfer content to be initially constructed as a union of contents, instead of requiring a post-export merging of XML documents.

FIG. 3 illustrates an example implementation in accordance with disclosed embodiments. A system executes a transfer function 302 to transfer a large XML document or set of documents. The system calls an exporter function 304. As the exporter function 304 performs the data gathering for the export, it calls the "buncher" function 306, which performs a coalescing process as described herein. The buncher function 306 returns the gathered and combined data in an efficient transfer back to exporter function 304, which returns the exported data back to transfer function 302.

In some implementations, the return value will include, in addition to the result set, information about which transfers have been combined to form the current result set. This information can then be used to log and monitor individual transfers even though they have been combined. Further, in various embodiments the transfer function can choose to abort transfers containing empty sets of content, which can provide benefits such as a reduction in number of transfers which are processed end-to-end.

In some cases, incorporating a coalescing process as a separate top-level step does allow for re-use among different source end-points. However, differences in XML schemas between different types of exporting systems could minimize that benefit in some cases.

U.S. Pat. Nos. 6,023,737 and 6,931,486 are incorporated by reference.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for coalescing data transfers in a data processing system, comprising:
 setting a maximum transfer delay in a data processing system;
 while a current delay is less than the maximum transfer delay, repeatedly performing the steps of
  searching for an additional transfer having a same source and target as a current transfer, by the data processing system, and
  when an additional transfer is found, adding the additional transfer to a transfer list that identifies transfers to be made together by the data processing system; and
 when the current delay has met or exceeded the maximum transfer delay, performing a transfer, by the data processing system, of the transfers identified by the transfer list.

2. The method of claim 1, further comprising publishing the transfer list as available additional transfers for another transfer process if an additional transfer is not found while the current delay is less than the maximum transfer delay.

3. The method of claim 2, further comprising removing the additional transfer from an additional transfer request.

4. The method of claim 2, further comprising initializing the transfer list to an empty list before the searching step is performed for the first time.

5. The method of claim 1, further comprising initializing the transfer list to an empty list before the searching step is performed for the first time.

6. The method of claim 1, wherein the transfers are transfers of XML data.

7. The method of claim 1, further comprising removing all transfers from the transfer list if the transfers identified by the transfer list are acquired by another transfer process.

8. A data processing system comprising a processor and accessible memory, the data processing system particularly configured to perform the steps of:
 setting a maximum transfer delay;
 while a current delay is less than the maximum transfer delay, repeatedly performing the steps of
  searching for an additional transfer having a same source and target as a current transfer, and
  when an additional transfer is found, adding the additional transfer to a transfer list that identifies transfers to be made together; and
 when the current delay has met or exceeded the maximum transfer delay, performing a transfer of the transfers identified by the transfer list.

9. The data processing system of claim 8, the data processing system further configured to perform the step of, publishing the transfer list as available additional transfers for another transfer process if an additional transfer is not found while the current delay is less than the maximum transfer delay.

10. The data processing system of claim 9, the data processing system further configured to perform the step of removing the additional transfer from an additional transfer request.

11. The data processing system of claim 9, the data processing system further configured to perform the step of initializing the transfer list to an empty list before the searching step is performed for the first time.

12. The data processing system of claim 8, the data processing system further configured to perform the step of initializing the transfer list to an empty list before the searching step is performed for the first time.

13. The data processing system of claim 8, wherein the transfers are transfers of XML data.

14. The data processing system of claim 8, the data processing system further configured to perform the step of removing all transfers from the transfer list if the transfers identified by the transfer list are acquired by another transfer process.

15. A computer-readable storage medium encoded with computer-executable instructions that, when executed, cause a data processing system to perform the steps of:
 setting a maximum transfer delay;
 while a current delay is less than the maximum transfer delay, repeatedly performing the steps of
  searching for an additional transfer having a same source and target as a current transfer, and
  when an additional transfer is found, adding the additional transfer to a transfer list that identifies transfers to be made together; and
 when the current delay has met or exceeded the maximum transfer delay, performing a transfer of the transfers identified by the transfer list.

16. The computer-readable storage medium of claim 15, further comprising instructions that, when executed, cause a data processing system to perform the steps of publishing the transfer list as available additional transfers for another transfer process if an additional transfer is not found while the current delay is less than the maximum transfer delay.

17. The computer-readable storage medium of claim 16, further comprising instructions that, when executed, cause a data processing system to perform the step of removing the additional transfer from an additional transfer request.

18. The computer-readable storage medium of claim 16, further comprising instructions that, when executed, cause a data processing system to perform the step of initializing the transfer list to an empty list before the searching step is performed for the first time.

19. The computer-readable storage medium of claim 15, further comprising instructions that, when executed, cause a data processing system to perform the step of initializing the transfer list to an empty list before the searching step is performed for the first time.

20. The computer-readable storage medium of claim 15, wherein the transfers are transfers of XML data.

21. The computer-readable storage medium of claim 15, further comprising instructions that, when executed, cause a data processing system to perform the step of removing all transfers from the transfer list if the transfers identified by the transfer list are acquired by another transfer process.

* * * * *